United States Patent [19]
Manz

[11] Patent Number: 6,149,423
[45] Date of Patent: Nov. 21, 2000

[54] HOT CHANNEL INJECTION MOULDING DIE

[75] Inventor: Willi Manz, Marthalen, Switzerland

[73] Assignee: Schottli AG, Diessenhofen, Switzerland

[21] Appl. No.: 08/930,849

[22] PCT Filed: Feb. 5, 1997

[86] PCT No.: PCT/CH97/00036

§ 371 Date: Oct. 7, 1997

§ 102(e) Date: Oct. 7, 1997

[87] PCT Pub. No.: WO97/28945

PCT Pub. Date: Aug. 14, 1997

[30] Foreign Application Priority Data

Feb. 7, 1996 [CH] Switzerland ............................ 321/96
Oct. 14, 1996 [CH] Switzerland .......................... 2504/96

[51] Int. Cl.⁷ ................................................ B29C 45/20
[52] U.S. Cl. ..................................... 425/549; 264/328.15
[58] Field of Search ....................... 425/549; 264/328.15, 264/328.14

[56] References Cited

U.S. PATENT DOCUMENTS 2,354,363  7/1944  Burry .
3,790,324  2/1974  Susin .

FOREIGN PATENT DOCUMENTS 1 188 316   9/1959  France .
60-165462   8/1985  Japan .
6 262650    9/1994  Japan .
243514     12/1925  United Kingdom .
1 535 164  12/1978  United Kingdom .
2 109 296   6/1983  United Kingdom .

Primary Examiner—Tim Heitbrink
Attorney, Agent, or Firm—Akin, Gump, Strauss, Hauer & Feld, L.L.P.

[57] ABSTRACT

The hot channel die (1) is arranged within a casing (13) filled with oil. In the hollow space (15) filled with oil, baffles (17, 19) are installed which effect a current of the oil directed toward the two ends of the die (1). For this purpose, the heating element (23) is arranged on the underside of the casing (13). The discharge sleeve (117), which introduces the liquid plastic from the feeding screw, discharges into the hollow body (115), which is mounted in a recess in the hot runner plate (105) of a hot channel injection molding die. The distribution conduits (119), which are constructed as curved tubes, are installed on the discharge sleeve (117), and lead to the side wall (121), against which the rear ends of the injection nozzles lie. The hollow space (125) is filled with a heat-conducting medium, for example oil, which is heated by a heater (127) and uniformly circulated within the hollow space (125) by convention or motorized circulation. Baffles (131) optimize the circulation of the medium and its return guidance to the heater (127).

12 Claims, 4 Drawing Sheets

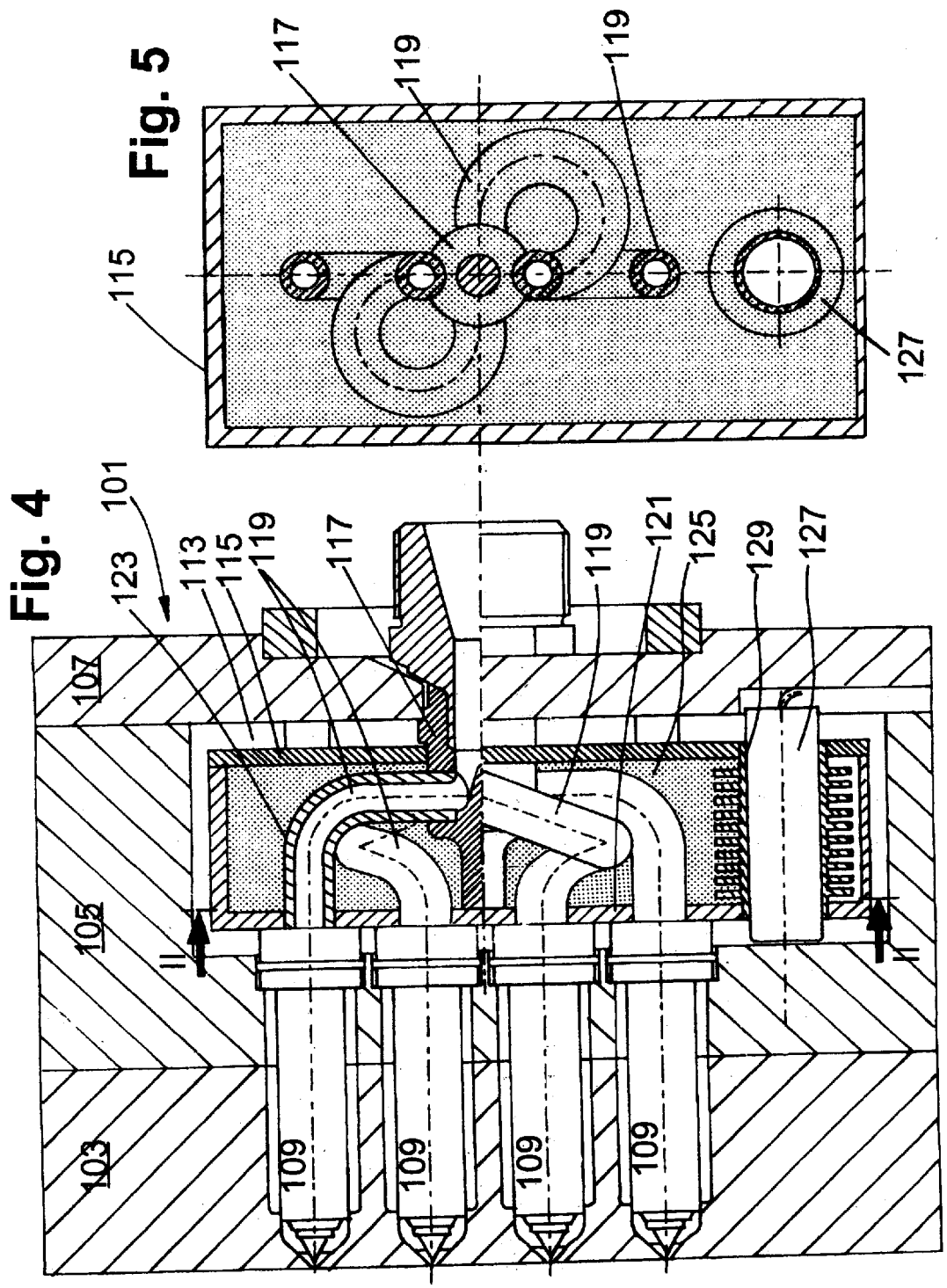

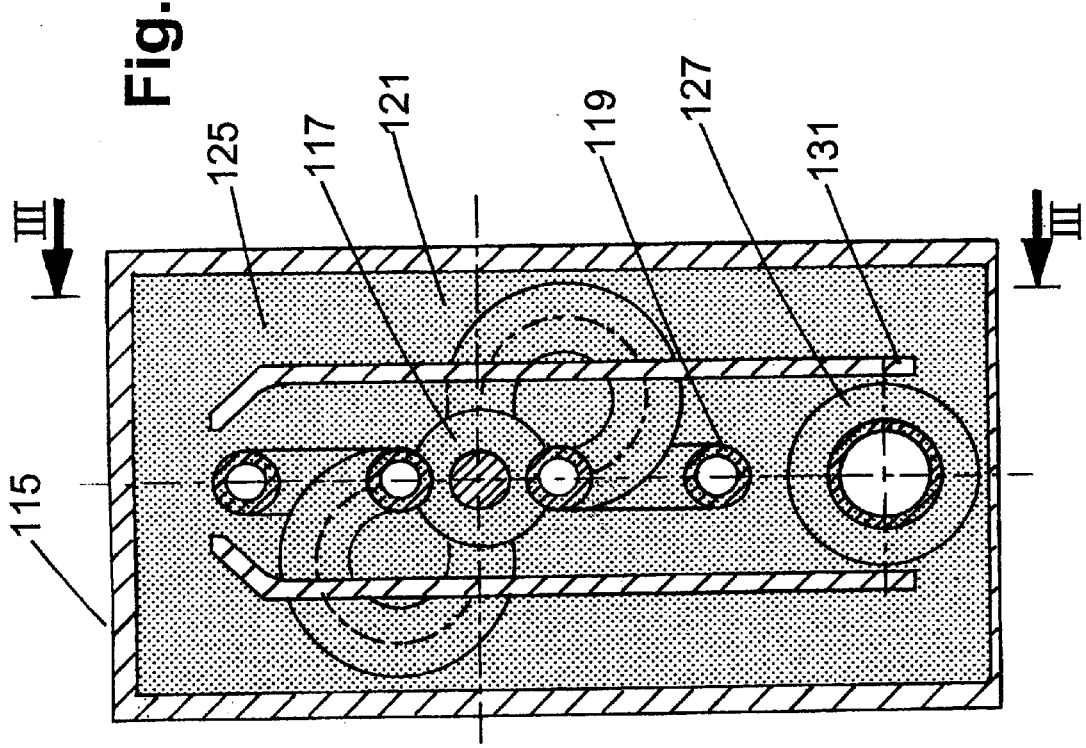
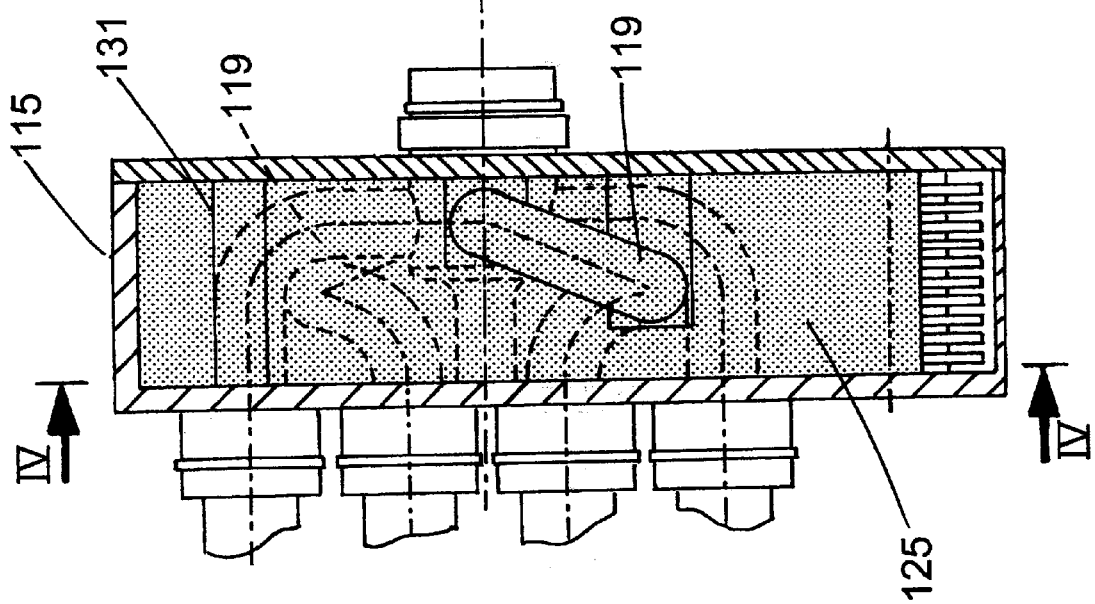

HOT CHANNEL INJECTION MOULDING DIE

BACKGROUND OF THE INVENTION

The present invention concerns a hot channel injection molding die including an injection die with a nozzle body having an injection channel, a heating jacket enclosed by a casing and surrounding the nozzle body, and an electrical element. The invention also concerns a hot channel injection molding die including a hot runner plate with a heater, wherein at least one distribution conduit in the hot runner plate conducts plastic material from a discharge sleeve to at least one injection nozzle.

With the conventional hot channel injection molds, also called hot runner molds, liquid plastic fed by the feeding screw conveyors of the injection machine is conducted into a heated distribution block to the injection nozzles arranged at a distance from a side face of the same. The distribution conduits within the distribution block are usually created by bore holes lying at right angles to one another. The production of such a distribution block with distribution channels running at right angles to one another is very expensive, and despite expensive processing methods, sharp edges arise on the right angle intersections of the channels which, for one, can damage plastic material transported in them, and on which deposits can establish themselves. Furthermore, the heating of the known distribution blocks has only been unsatisfactorily worked out, since higher temperatures occur in channels situated respectively closer to the heating rods than in regions further removed. Moreover, the temperature profile in the individual channels is different. This can lead to local uncontrolled overheating of the plastic material, especially when the machine is shut down for a time during production interruptions.

The same problems with reference to temperature profiles also occur in hot channel dies in injection molds. For their heating, electrical resistance wires are arranged around or in the nozzle (die) body. The resistance wires can be embedded in a carrier material substrate or be arranged directly on the surface of the nozzle body. The nozzle body is joined at the foot end in the injection mold with the heat channel distributor in a heat-conducting manner, and the hot channel plate is likewise joined at the outflow side with the base plate forming the cavity. Heat flows over these contact points from the hot channel distributor block into the nozzle body, and from the nozzle body into the hot channel plate, and on the base plate side heat flows from the heated nozzle to the cooled base plate. These inflows and outflows of heat have the effect that the nozzle is not evenly heated over its entire length. The temperature profile is, however, also not uniform in its radial extension. This non-homogeneous heat distribution can lead to the consequence that individual sections of the nozzle can damage the plastic material to be injected due to overheating, which leads to sacrifices in quality of the product generated by the plastic injection machine.

SUMMARY OF THE INVENTION

One object of the present invention is creating a hot channel die with a heater which generates a basically constant heat distribution or a uniform temperature profile over the entire nozzle body.

An additional object of the present invention is creating a hot channel injection mold, especially a distribution block, which makes possible a sparing and residue-free transit of the liquid plastic to the hot channel nozzle, and with which a uniform heat supply to the distribution channels is moreover guaranteed.

These objects are accomplished by a hot channel injection molding die with a hot channel nozzle having a heating jacket formed by a fluid in a hollow space lying between the nozzle body and its casing, with the heating element lying below the casing. For a hot channel injection molding die having a hot runner plate, the hot runner plate includes a box-shaped hollow body in whose hollow space at least one distribution conduit is led by a central distribution tube to at least one injection nozzle arranged at a distance, and the heater is arranged below the at least one distribution conduit. Advantageous configurations of the invention are defined hereinafter.

The good conductivity of fluid situated in the intermediate space between the nozzle and a casing enclosing the nozzle body or the partition in the distributor block makes possible an optimal, even distribution of the heat supplied by the heating element under the nozzle or the distribution conduits. The fluid which is more strongly heated locally by the heating element can be conducted by convection around the nozzle body or the distribution conduits, and especially into the contact regions with the hot channel plates and with the base plate.

An especially optimal distribution of the quantity of heat supplied along the nozzle or the distribution conduits can be realized by guide means. These run in a preferred embodiment from the middle region of the nozzle toward its two ends and steer the fluid stream into the heat outflow zones. The heating element can be mounted on the casing from the outside and consequently be replaced without trouble in the event of a defect.

The essentially constant temperature over the entire nozzle length in a narrow temperature range makes possible the processing of temperature-sensitive plastics. The casting losses arising in a cold channel process can therewith be completely avoided.

The distribution block is hollow and filled with a fluid heating medium, which uniformly surrounds the kink-free curved distribution tubes arranged therein. The heater is installed in the base area below the distribution tubes and effects a circulation of the heating medium generated by convection around the distribution tubes. Suitably arranged guide means increase the circulation and produce an absolutely uniform heating of the distribution tubes and the liquid plastic conducted therein. The distribution tubes can be manufactured with optimal bending radii (as they are mounted running freely through the hollow space), and if desired, their length can be constructed identically for all tubes independent of the distance of the entry point of the plastic into the channel block. This yields an absolutely equal residence time of the plastic within the distribution tubes.

BRIEF DESCRIPTION OF THE DRAWINGS

The invention will be explained in greater detail on the basis of illustrated embodiments, wherein:

FIG. 4 is a cross section through a hot channel injection molding die with four injection nozzles lying vertically above one another;

FIG. 5 is a cross section along line II—II through the distribution block in FIG. 4;

FIG. 6 is a cross section through a further embodiment of the invention along line III—III in FIG. 7 with four injection nozzles lying one above the other;

FIG. 7 is a cross section along line IV—IV in FIG. 6.

DETAILED DESCRIPTION OF THE INVENTION

Figure 1:
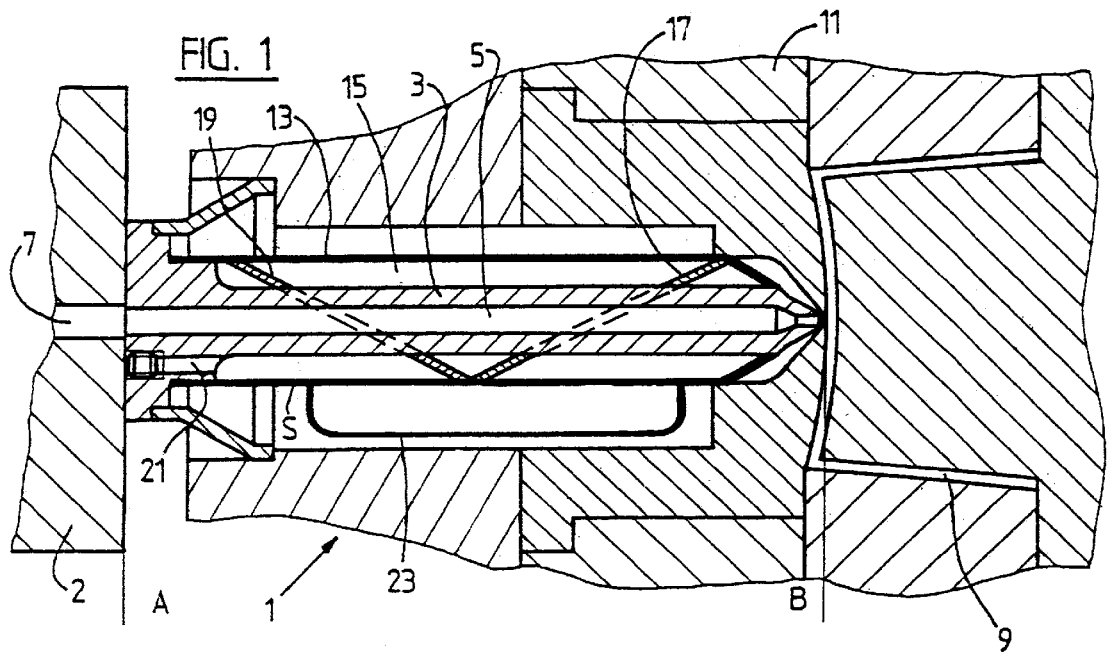
FIG. 1 is a partial cross section through a plastic injection molding die according to the present invention.

The entirety of a hot channel nozzle, designated with reference numeral 1, has a tube-shaped nozzle body 3 with a central boring which forms the injection channel 5 and is aligned at the entry side in region A with a boring 7 in the hot channel plate 2. The injection channel 5 ends in region B, but tapers there before the cavity 9. The cavity 9 is located in the so-called base plate 11, also called the insertion plate. The nozzle body 3 is enclosed over almost its entire length by a casing 13 forming a hollow space 15. Within the hollow space are contained two guide means 17 and 19 which embrace the nozzle body 3. The peripheries of the two guide means 17 and 19 preferably lie against the interior of the casing 13. The total hollow space 15 is filled with a fluid, for example with oil. The latter is poured in through a bore hole 21. Another heat-conducting liquid or a gas could be poured in as an alternative to oil.

Below the casing 13 a heating element 23 is arranged. This lies completely on the surface of the casing 13.

Figure 3:
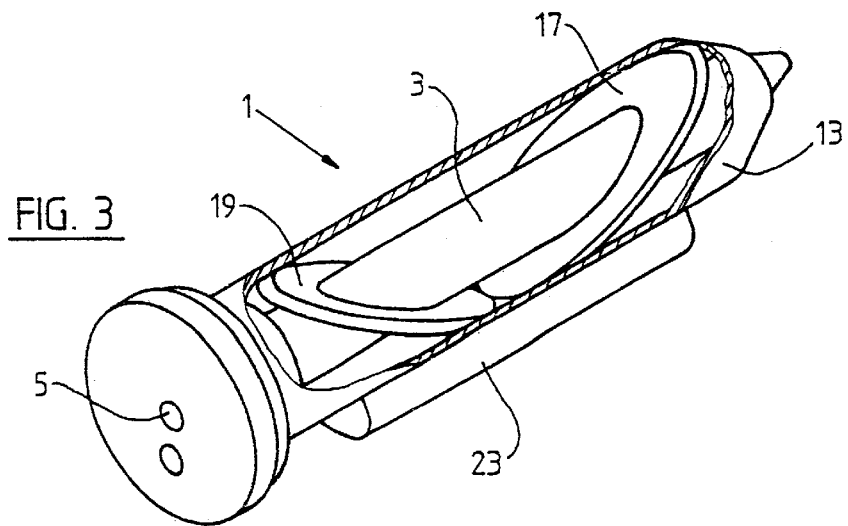
FIG. 3 is a perspective representation of the nozzle body with guide means installed and casing indicated.

From the representation in FIG. 3 the position of the two baffles 17 and 19 within the indicated casing 13 can be seen in perspective.

Figure 2:
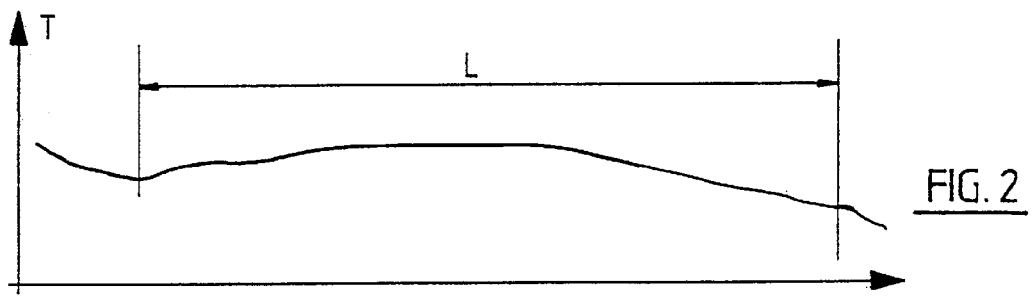
FIG. 2 is a diagram of the temperature profile along the nozzle.

FIG. 2 shows the profile of the temperature T over the entire length of the nozzle body 3 and further partial areas at both ends in the hot channel plate 2 and in the base plate 11.

As an alternative to the casing 13 represented as a cylinder in the Figures, a conically shaped casing could also be used in order to support the heat transport appropriately.

As an alternative to the elliptically configured baffles 17 and 19, beads (20) can be applied to the casing 13, which project into the hollow space 15 and assume the function of the baffles 17 and 19. These embodiments are represented in FIG. 1A.

In the following, the functioning of the heating of the hot channel nozzle 1 will first be explained. The heat generated by the heating element 23 proceeds from below through the jacket of the casing 13 to the oil in the space 15. This is heated and rises upwardly on both sides from the deepest spot in the region area of the crest S. The rise does not, however, take place vertically, but the two baffles 17 and 19 cause the heated rising oil to be deflected to the ends of the nozzle body. In these regions A, B, the nozzle body 3 is strongly heated or cooled as a consequence of heat inflow and outflow in adjacent regions. The oil arriving there evens out the temperature differences and is deflected, in order then to be reheated in the region of the lower crest S over the heat source, namely the heating element 23. It can begin its journey through the space 15 again. The oil, which is situated between the two baffles 17 and 19, is also heated strongly enough there to rise upwardly, and brings about an essentially even distribution of the heat along the upper-lying jacket surface of the nozzle body 3. Experiments have shown that a nearly constant temperature profile, being within a few degrees Celsius in accordance with FIG. 2, results with a hot channel nozzle outfitted in accordance with FIG. 1. It is apparent from this curve that in region A the temperature is highest, namely because the hot channel distributor 2 is likewise heated to keep the plastic material liquid in the boring hole 7. The temperature T remains almost constant until near the end at the base plate side of the nozzle 3, and ranges even in a band of a few degrees Celsius. Only in the region of the transition to the cooled base plate 11 does the temperature fall below the mean value. It remains nonetheless within an optimal processing range for the plastic material. A temperature spike, which can lead to damaging the material, is successfully avoided.

Figure 1A:
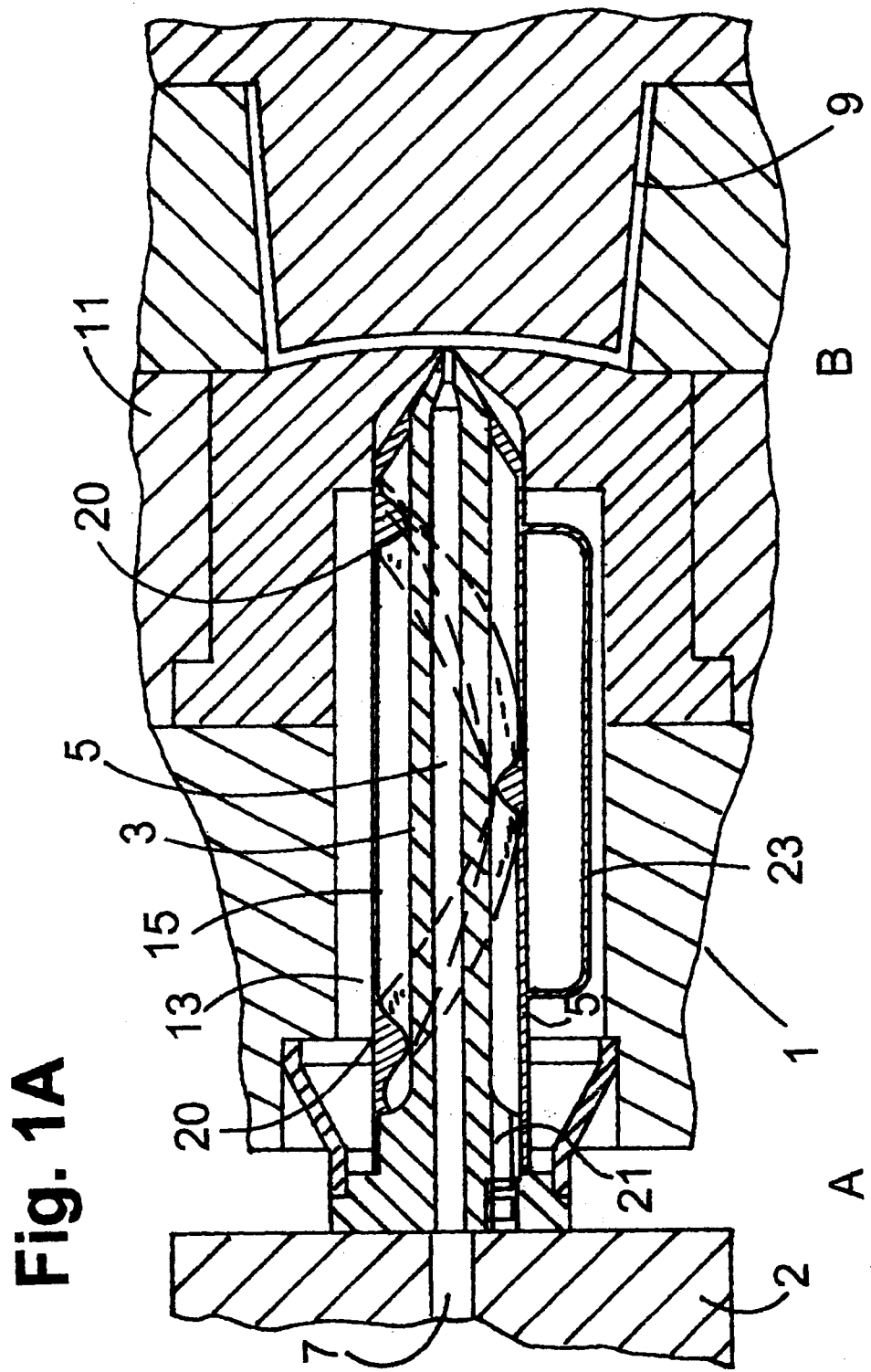
FIG. 1A is a partial cross section through an alternate embodiment of the plastic injection molding die of FIG. 1.

The embodiment described in FIGS. 1, 2, and 3 depicts two baffles 17, 19. Obviously, with a longer nozzle, a modified baffle configuration could find application. Equally obvious would be such a configuration with a single baffle 17, in the event that the nozzle is very short.

In FIG. 4, a hot channel injection molding die is visible, which includes three mold blocks, namely the base plate 103, the hot runner plate 105 and a cover plate 107. Four injection nozzles 109 are installed in the base plate 103, which lie vertically directly above one another. In the cover plate 107, a discharge sleeve 117 is mounted in which the outlet opening for the liquified plastic material is situated, which for example can be conveyed to the hot channel injection molding die 101 by a screw conveyor and introduced into this. The hot runner plate 105 has a recess 113, in which a hollow body 115 is installed in the embodiments represented. In the hollow body 115, or in the recess 113, a discharge sleeve 117 is mounted for introducing the liquid plastic mass. From this the liquid plastic is distributed to the injection nozzles 109 by distribution conduits 119. The distribution conduits 119 end in the side wall 121 of the hollow body 115 and are tightly connected with the latter, for example hard soldered, welded or the like. The tube-shaped distribution conduits 119 have curved regions 123 between the connection point A with the discharge sleeve 117 and their ends in the wall 121, the bending radius of which has the largest possible value permitted by the space relationship. The two conduits 119 leading to the injection nozzles 109 lying uppermost and undermost in FIGS. 4 and 5 have a course with a 90° bend lying in a plane. The two other distribution conduits 119, which lead to the two injection nozzles 109 lying inbetween, emerge first horizontally from the discharge sleeve 117 and lead in a three-dimensional course to the injection nozzles 109 (see especially FIG. 5).

In the hollow space 125 of the hollow body 115 or below it, a further heat source, for example a heating cartridge 127, is inserted. Preferably, the heating cartridge 127 lies protected in a tube 129, which is open on both ends and permits changing the heat cartridge 127 without having to open the hollow body 115. This is completely filled with a heat-conducting medium, for example a liquid, such as oil, or a gas. The medium surrounds the distribution conduits 119 situated in the hollow space 125, and the discharge sleeve 117 as well.

In the following, the functioning of the heating of the distribution conduits 119 in the hot runner plate 105 is explained. The heat generated in the interior of the hollow body 115 by the heater below the distribution conduits 119 is transferred to the heat-conducting medium, and begins a circulation by convection and therewith uniform coverage of all surfaces of the distribution conduits 119 lying in the heat-conducting medium. The circulation of the medium effects a balanced heat transfer from the medium to the distribution conduits 119 and the plastic material conducted therein. A local overheating, for example in the region of the distribution tube 119 lying closest to the heater 127, is ruled out. As an alternative to the circulation of the medium by convection, a circulation can take place with a pump in very large molds (no illustration).

In a further advantageous configuration in accordance with FIGS. 6 and 7, baffles 131 are installed in the hollow space 125 of the hollow body 115 laterally of the distribution conduits 119. The baffles 131 conduct the medium heated by the heater 127 upward within a narrow channel 133 along the distribution conduits lying one above the other and allow the medium thereby cooled above, and for this reason specifically heavier, to sink downward outside the baffles 131, where it is warmed again at the heater 127. In order to keep the vertical narrow channel 133 formed by the baffles 131 as narrow as possible, the looped-shaped segments of the distribution conduits 119 penetrate the baffles 131.

I claim:

1. Hot channel injection molding die, including an injection die with a nozzle body which contains an injection channel, a heating jacket enclosed by a casing and surrounding the nozzle body, and an electrical heating element, the heating jacket is formed by a fluid in a hollow space lying between the nozzle body (3) and the casing (13), and in that the heating element (23) lies below the casing (13), and at least one guide (17, 19) positioned within the fluid which at least partially embraces the nozzle body (3).

2. Hot channel injection molding die according to claim 1, characterized in that the guide (17, 19) is an elliptical ring.

3. Hot channel injection molding die according to claim 1, characterized in that the guide (17, 19) is formed by an inwardly directed bead on the casing (13).

4. Hot channel injection molding die according to claim 1, characterized in that the fluid heated by the heating element (23) is guided to the two ends of the nozzle body (3) by the guide means (17, 19).

5. Hot channel injection molding die according to claim 1, characterized in that the heating element (23) is arranged in a region of the lower crest line (S) of the casing (13).

6. Hot channel injection molding die according to claim 1, characterized in that the fluid is a liquid or a gas.

7. Hot channel injection molding die (101), including a hot runner plate (105) with a heater (127), the hot runner plate (105) including at least one distribution conduit (119) leading the liquid plastic material from a discharge sleeve (117) to at least one injection nozzle (109), the hot runner plate (105) including a box-shaped hollow body (115) in whose hollow space (125) the at least one distribution conduit (119) is led by a central distribution tube (117) to the at least one injection nozzle (109) arranged at a distance, the heater (127) being arranged below the at least one distribution conduit (119), and baffles (131) arranged in the hollow space (125) lateral to the distribution conduits (119).

8. Hot channel injection molding die according to claim 7, characterized in that several distribution conduits (119) of equal length are arranged within the hollow space (125), and comprise kink-free curved tubes.

9. Hot channel injection molding die according to claim 7, characterized in that the hollow space (125) is filled with a heat-conducting liquid or gaseous medium.

10. Hot channel injection molding die according to claim 7, characterized in that the heater (127) is installed in a region of the bottom of the hollow space (125).

11. Hot channel injection molding die according to claim 10, characterized in that the heater (127) is installed in a tube (129) inside or outside on the underside of the hollow body (115), and can be changed from outside.

12. Hot channel injection molding die according to claim 7, characterized in that the heat-conducting medium is circulated by convection or by a pump in the hollow space (125).

* * * * *